(12) United States Patent
Jeng et al.

(10) Patent No.: US 10,574,695 B2
(45) Date of Patent: Feb. 25, 2020

(54) GATEWAY APPARATUS, DETECTING METHOD OF MALICIOUS DOMAIN AND HACKED HOST THEREOF, AND NON-TRANSITORY COMPUTER READABLE MEDIUM

(71) Applicant: Chunghwa Telecom Co., Ltd., Taoyuan (TW)

(72) Inventors: Tzung-Han Jeng, Taoyuan (TW); Chien-Chih Chen, Taoyuan (TW); Jia-Hao Sun, Taoyuan (TW); Kuang-Hung Chang, Taoyuan (TW); Kuo-Sen Chou, Taoyuan (TW)

(73) Assignee: Chunghwa Telecom Co., Ltd., Taoyuan (TW)

( * ) Notice: Subject to any disclaimer, the term of this patent is extended or adjusted under 35 U.S.C. 154(b) by 237 days.

(21) Appl. No.: 15/667,632

(22) Filed: Aug. 3, 2017

(65) Prior Publication Data
US 2019/0028508 A1   Jan. 24, 2019

(30) Foreign Application Priority Data

Jul. 20, 2017   (TW) .............................. 106124398 A (51) Int. Cl.
*H04L 29/06* (2006.01)
*H04L 12/26* (2006.01)
*H04L 29/12* (2006.01)

(52) U.S. Cl.
CPC .......... *H04L 63/1483* (2013.01); *H04L 43/16* (2013.01); *H04L 63/14* (2013.01);
(Continued)

(58) Field of Classification Search
None
See application file for complete search history.

(56) References Cited

U.S. PATENT DOCUMENTS

| 6,895,091 B1 | 5/2005 | Elliott et al. |
| 7,236,597 B2 | 6/2007 | Elliott et al. |

(Continued)

FOREIGN PATENT DOCUMENTS

TW    I455546    10/2014

OTHER PUBLICATIONS

No stated author; HTTP Messages; 2016; Retrieved from the Internet URL: https://web.archive.org/web/20161224164746/https://developer.mozilla.org/en-US/docs/Web/HTTP/Messages; pp. 1-7, as printed. (Year: 2016).*

*Primary Examiner* — Aravind K Moorthy
*Assistant Examiner* — Michael W Chao
(74) *Attorney, Agent, or Firm* — JCIPRNET (57) ABSTRACT

A gateway apparatus, a detecting method of malicious domain and hacked host thereof, and a non-transitory computer readable medium are provided. The detecting method includes the following steps: capturing network traffics, and parsing traces and channels from the network traffics. Each channel is related to a link between a domain and an Internet Protocol (IP) address, and each trace is related to an http request requested from the IP address for asking the domain. Then, a trace-channel behavior graph is established. The malicious degree model is trained based on the trace-channel behavior graph and threat intelligence. Accordingly, a malicious degree of an unknown channel can be determined, thereby providing a detecting method with high precision.

6 Claims, 9 Drawing Sheets

(52) U.S. Cl.
CPC ........ *H04L 63/1425* (2013.01); *H04L 43/024* (2013.01); *H04L 43/12* (2013.01); *H04L 61/1511* (2013.01); *H04L 2463/144* (2013.01); *H04L 2463/146* (2013.01)

(56) References Cited

U.S. PATENT DOCUMENTS

| | | | |
|---|---|---|---|
| 8,260,914 B1 * | 9/2012 | Ranjan | H04L 61/1511 709/224 |
| 8,402,543 B1 * | 3/2013 | Ranjan | H04L 63/1416 709/223 |
| 8,561,188 B1 | 10/2013 | Wang et al. | |
| 8,762,298 B1 * | 6/2014 | Ranjan | G06N 5/02 706/12 |
| 8,813,236 B1 * | 8/2014 | Saha | H04L 63/1408 726/22 |
| 9,628,508 B2 * | 4/2017 | Turbin | H04L 63/1416 |
| 9,635,049 B1 * | 4/2017 | Oprea | H04L 63/145 |
| 10,038,703 B2 * | 7/2018 | Liu | H04L 63/1433 |
| 10,326,792 B2 * | 6/2019 | Hagiwara | G06F 21/56 |
| 10,375,096 B2 * | 8/2019 | Machlica | H04L 43/08 |
| 10,425,383 B2 * | 9/2019 | Yu | H04L 61/1511 |
| 10,430,588 B2 * | 10/2019 | Volkov | H04L 63/1491 |
| 10,440,035 B2 * | 10/2019 | Bartos | H04L 63/0236 |
| 10,462,159 B2 * | 10/2019 | Inoue | H04L 63/1416 |
| 2012/0084860 A1 * | 4/2012 | Cao | H04L 63/1441 726/23 |
| 2012/0198549 A1 | 8/2012 | Antonakakis et al. | |
| 2016/0149937 A1 * | 5/2016 | Katmor | H04L 63/0263 726/23 |
| 2018/0343272 A1 * | 11/2018 | Khalil | H04L 63/1425 |
| 2019/0164071 A1 * | 5/2019 | Paugh | G06N 5/046 |
| 2019/0182281 A1 * | 6/2019 | Neil | H04L 63/1433 |
| 2019/0297092 A1 * | 9/2019 | Shibahara | H04L 63/145 |

* cited by examiner

| Item | TimeStamp | Client-IP | DestUrl | Method | HTTP request |
|---|---|---|---|---|---|
| 1 | 10001 | 10.10.10.1 | domain 1 | GET | /PAGEa?pa1=1qa&Pa2=2ws&Pa3=3ed |
| 2 | 10002 | 10.10.10.1 | domain 1 | GET | /PAGEb?pb1=z2w&Pb2=cde&Pb3=bgt |
| 3 | 10003 | 10.10.10.2 | domain 2 | GET | /PAGEa?pa1=5tg&Pa2=6yh&Pa3=7uj |
| 4 | 10004 | 10.10.10.2 | domain 2 | GET | /PAGEb?pb1=rty&Pb2=ki8&Pb3=ju7 |
| 5 | 10005 | 10.10.10.3 | domain 3 | GET | /PAGEa?pa1=fgh&Pa2=de3&Pa3=frg |
| 6 | 10006 | 10.10.10.4 | domain 4 | GET | /PAGEc?pc1=3e4&Pc2=efr&Pc3=hgf |
| 7 | 10007 | 10.10.10.4 | domain 4 | GET | /PAGEd?pd1=1o9&Pd2=yre&Pd3=jki |
| 8 | 10008 | 10.10.10.5 | domain 5 | GET | /PAGEc?pc1=r5t&Pc2=7yu&Pc3=8i6 |

Cache-ktupy.fruj.com_10.126.xx.12    GET_/repoinfo/autoup/stone01/log.jpg?st=|did|
Cache-ktupy.fruj.com_10.126.xx.12    GET_/fucin/upfin/stoneat/exe.instrusions?st=|do|
Cache-ktupy.fruj.com_10.126.xx.12    GET_/free/inent/stoneph/dll.extension?st=|done|
Cache-touch.kcoews.com_10.126.xx.75  GET_/repoinfoo/autoup/stone01/log.jpg?st=|did|
Cache-touch.kcoews.com_10.126.xx.75  GET_/fucin/upfin/stoneat/exe.instrusions?st=|do|
Cache-touch.kcoews.com_10.126.xx.75  GET_/free/inent/stoneph/dll.extension?st=|done|
Cache-ketyr.kmfpru.com_10.126.xx.48  GET_/repoinfoo/autoup/stone01/log.jpg?st=|did|
Cache-ketyr.kmfpru.com_10.126.xx.48  GET_/fucin/upfin/stoneat/exe.instrusions?st=|do|
Cache-ketyr.kmfpru.com_10.126.xx.48  GET_/free/inent/stoneph/dll.extension?st=|done|

Channel=Domain+Client-IP     HTTP Request=>Trace

| Label | Channel | $m=|X|/|T|$ | $u=|U|/|T|$ | $t=|T|$ |
|---|---|---|---|---|
| Malicious | maybeyouwin.website_10.166.63.21 | 1.0 | 0.0 | 22.0 |
| Benign | rest.sinyi.com.tw_10.166.45.32 | 0.0 | 1.0 | 6.0 |
| Unknown | ak.imgfarm.com_10.166.54.67 | 0.25 | 0.75 | 16.0 |
| Unknown | whatsyourluckynumber.club_10.166.42.58 | 1.0 | 0.0 | 22.0 |

FIG. 8

| Channel | Possibility[Benign,Malicious] | $m=\|x\|/\|T\|$ | $n=\|U\|/\|T\|$ | $t=\|T\|$ | Classified |
|---|---|---|---|---|---|
| ak.imgfarm.com_10.166.54.67 | [0.1262362311159,0.8737637688841] | 0.25 | 0.75 | 16.0 | Malicious |
| whatsyourluckynumber.club_10.166.42.58 | [0.2930966332948,0.7069033667052] | 1.0 | 0.0 | 22.0 | Malicious |

FIG. 9

GATEWAY APPARATUS, DETECTING METHOD OF MALICIOUS DOMAIN AND HACKED HOST THEREOF, AND NON-TRANSITORY COMPUTER READABLE MEDIUM

CROSS-REFERENCE TO RELATED APPLICATION

This application claims the priority benefit of Taiwan application serial no. 106124398, filed on Jul. 20, 2017. The entirety of the above-mentioned patent application is hereby incorporated by reference herein and made a part of this specification.

BACKGROUND OF THE DISCLOSURE

Field of the Disclosure

The disclosure is related to an information security technology, and more particularly related to a gateway apparatus, a detecting method of malicious domain and hacked host thereof and a non-transitory computer readable medium.

Description of Related Art

Malicious domains are hotbeds of cybercrimes (i.e. malicious behaviors such as spreading spam emails, financial fraud, phishing sites and etc.). It is a highly important information security issue for companies to detect the suspicious domain in time among massive amount of external connections.

After hackers construct a relay station, they implant a malicious software (malware) into victims' hosts through social emails, phishing sites or other approaches to make the hosts become bots. Most of the malwares in the bots require a network connection to perform malicious activities (e.g., sending spam emails, leaking private information, downloading update of malware, infecting surrounding hosts and so on). In order to keep botnet active, the hackers usually use domain flux technology or the like to avoid detection and prevent the implanted malware from being blocked. In view of the above, information security service providers need to find out a technology that can effectively detect the malicious domains and hacked hosts.

SUMMARY OF THE DISCLOSURE

Accordingly, the disclosure provides a gateway apparatus, a detecting method of a malicious domain and a hacked host thereof and a non-transitory computer readable medium, which provide a detecting technology with high precision.

In the disclosure, the detecting method of malicious domain and hacked host is adapted to a gateway apparatus and includes the following steps: receiving network traffics; parsing traces and channels from the network traffics; each channel is related to a link between a domain and an Internet Protocol (IP) address, and each trace is related to a HyperText Transfer Protocol (HTTP) request requested from the IP address for asking the domain, establishing a linking relationship between the traces and the channels; constructing a malicious degree model based on the linking relationship and threat intelligence; and determining an unknown channel through the malicious degree model.

In the disclosure, the gateway apparatus is respectively connected to an internal network and an external network. The gateway apparatus includes a communicating unit, a storage unit and a processing unit. The communicating unit is configured to transmit and receive data. The storage unit is configured to record a number of modules. The processing unit is coupled to the communicating unit and the storage unit, and accesses as well as executes the modules stored in the storage unit. The modules include a traffic-capturing module, a model learning module and a cybercrime channel tracking module. The traffic-capturing module receives the network traffics between the internal network and external network through the communicating unit. The model learning module parses traces and channels from the network traffics to establish a linking relationship between the traces and the channels, and constructs a malicious degree model based on the linking relationship and threat intelligence. Each channel is related to a link between a domain and an IP address, and each trace is related to a HTTP request requested from the IP address for asking the domain. The cybercrime channel tracking module can determine the unknown channel based on the malicious degree model.

In the disclosure, the non-transitory computer readable medium records a program and is loaded through a gateway apparatus to execute the following steps: receiving network traffics; parsing traces and channels from the network traffics; each channel is related to a link between a domain and an IP address, and each trace is related to a HTTP request requested from the IP address for asking the domain, establishing a linking relationship between the traces and the channels; constructing a malicious degree model based on the linking relationship and threat intelligence; and determining an unknown channel through the malicious degree model.

In summary, based on a trace-channel behavior graph formed by the linking relationship, the behavior features of the trace of malicious channel and benign channel can be obtained. Then a machine learning technology is employed to construct a malicious degree model to facilitate determination of the unknown channel in the subsequent process.

In order to make the aforementioned features and advantages of the disclosure more comprehensible, embodiments accompanying figures are described in detail below.

DESCRIPTION OF EMBODIMENTS

Network traffic log data take logs of the trace of transmitted/received network traffics. Since a malware is usually connected to a specific external site, a corresponding HyperText Transfer Protocol (HTTP) request definitely leaves a clue indicating visit of the malware and such clue is recorded in the network traffic log data. The disclosure uses the characteristic that the malware asks and interacts with a relay station in a similar way as HTTP request to make analysis of the network traffic so as to form the trace-channel behavior graph, construct the malicious degree model that detects the unknown malicious network and hacked host based on the acquired threat intelligence, thereby detecting the degree of maliciousness of the network channel. The spirit of the disclosure is conveyed via the following descriptions.

Figure 1:
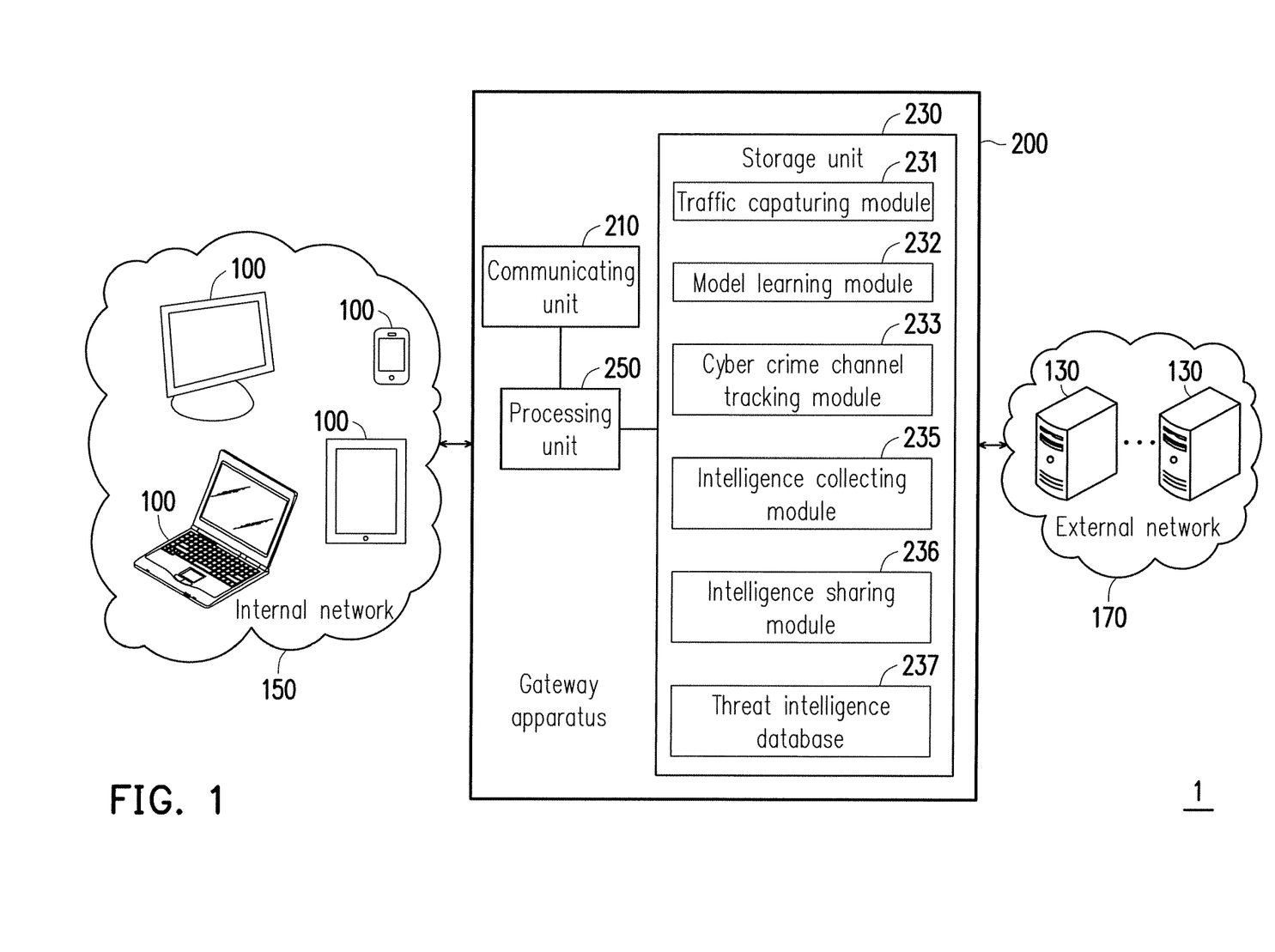
FIG. 1 is a schematic view of a construction of a communicating system according one embodiment of the disclosure.

FIG. 1 is a schematic view of a construction of a communicating system 1 according one embodiment of the disclosure. The communicating system 1 includes one or more user hosts 100 in an internal network 150 (e.g., local access network (LAN)), one or more external hosts 130 in an external network 170 (e.g., Internet) and a gateway apparatus 200.

The user hosts 100 may be any type of electronic devices having networking functions such as a desktop computer, a notebook computer, a server, a smart phone, a tablet PC and the like.

The external host 130 may be a network-connectable device such as a server, a working station, a relay station and so on. It should be indicated that, in the embodiment, the internal network 150 and external network 170 are used mainly to distinguish two different networks.

The gateway apparatus 200 is between the internal network 150 and external network 170. The gateway apparatus 200 includes a communicating unit 210, a storage unit 230 and a processing unit 250. The communicating unit 210 may be any type of network interface having Ethernet, optical fiber and the like or other communication transmitting functions for being connected to the internal network 150 and external network 170.

The storage unit 230 may be any type of fixed or movable random access memory (RAM), a read-only memory (ROM), a flash memory, a hard disk drive (HDD), a solid-state drive (SSD) or a similar component or a combination of the above-mentioned components such as a network attached storage (NAS), and is used to record information such as network traffics, traffic logs, and trace-channel behavior graph, threat intelligence database 237, and programs such as traffic (log) capturing module 231, a model learning module 232, a cybercrime channel tracking module 233, an intelligence collecting module 235, and an intelligence sharing module 236.

The processing unit 250 is connected to the communicating unit 210 and the storage unit 230, and may be a central processing unit (CPU), other programmable microprocessor, digital signal processor (DSP), programmable controller, special application integrated circuit (ASIC) for general or special purposes, or other similar components or a combination of the above-mentioned components. In the embodiments of the disclosure, the processing unit 250 serves to execute all operations of the gateway apparatus 200, and can access as well as execute the module recorded in the storage unit 230.

Figure 2:
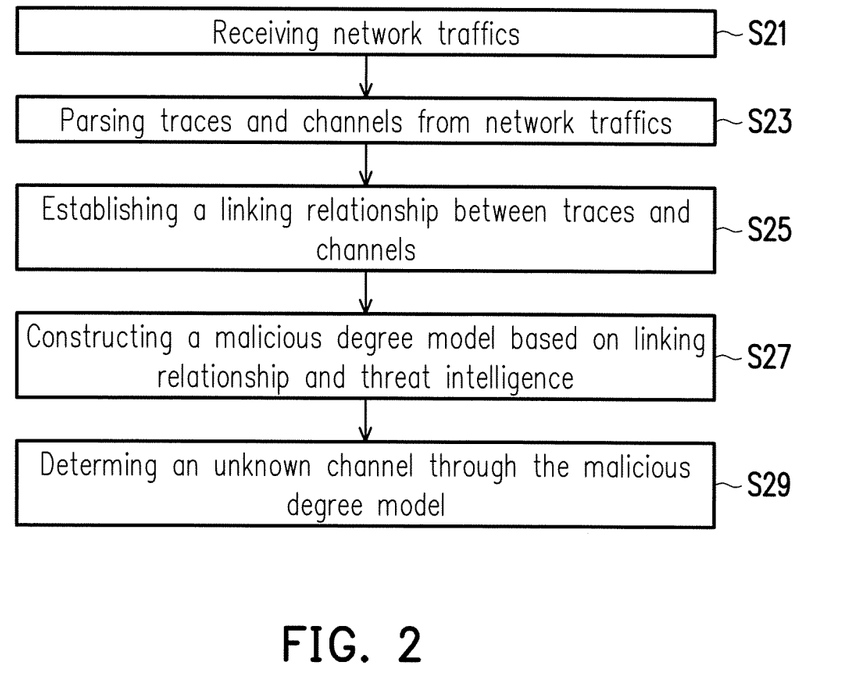
FIG. 2 is a flowchart illustrating a detecting method according to one embodiment of the disclosure.

For ease of understanding the operation process of the embodiments of the disclosure, the following various embodiments are incorporated in details to describe a detecting method of the gateway apparatus 200 in the embodiment of the disclosure for detecting the malicious domain and hacked host. FIG. 2 is a flowchart illustrating a detecting method according to one embodiment of the disclosure. Referring to FIG. 2, the method described in the embodiment is adapted to every device in the communicating system 1 of FIG. 1. The method in the embodiment of the disclosure is described below with descriptions of components and modules of the gateway apparatus 200. Each of the steps of the method may be adjusted according to actual implementations and is not limited to the embodiments provided herein.

Figure 3:
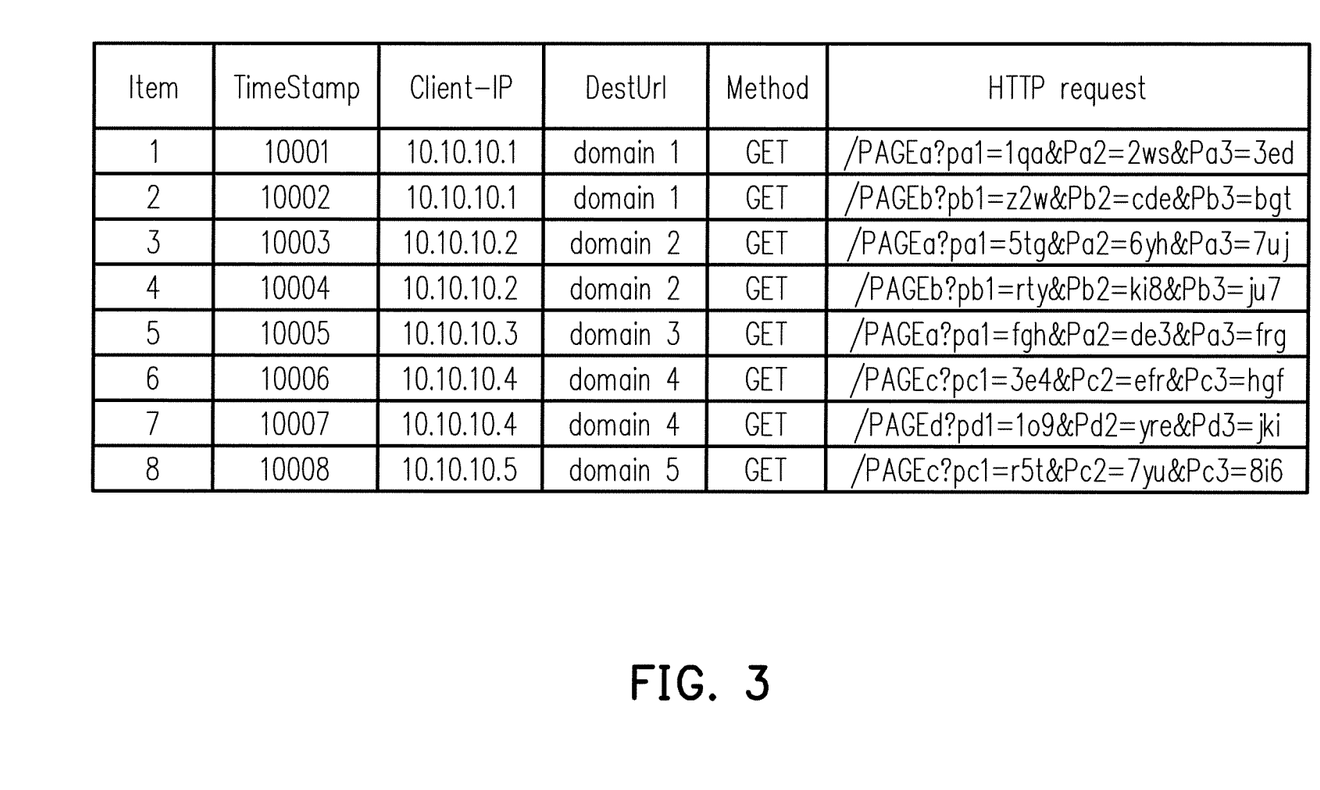
FIG. 3 is an example describing network traffic data.

The traffic capturing module 231 receives data generated by the network traffics through the communicating unit 210 (step S21), for example, by capturing a package capture (PCAP) generated by the network traffics or network traffic data such as proxy server logs. For example, FIG. 3 is an example describing network traffic data, which mainly includes a time stamp (TimeStamp), a Client-IP (e.g., IP address of host server 100), a destination Uniform Resource Locator (URL) (DestUrl) (e.g., a domain registered by external host 130), a connecting method (Method) and a HTTP request.

On the other hand, the intelligence collecting module 235 receives information security data such as malwares, virus, improper network behaviors, cyber threat intelligence and so on provided by different sources (e.g., http://www.malware-traffic-analysis.net/, VirusTotal, Bluecoat and etc.), and integrates the newly generated cyber threat intelligence to enrich the threat intelligence database 237 so as to make the calculation to be more precise afterwards.

The module learning module 232 parses traces and channels from the network traffics (step S23). Specifically, the model learning module 232 defines the link between a domain and an IP address (e.g., an IP address of the user host 100) as a channel, and defines the HTTP request requested from an IP address for asking the domain as a trace. Since different malwares that are connected to the malicious relay station use similar HTTP request to ask the relay station (e.g., external host 130), thus parsing the HTTP request would be necessary in the disclosure.

Figure 4:
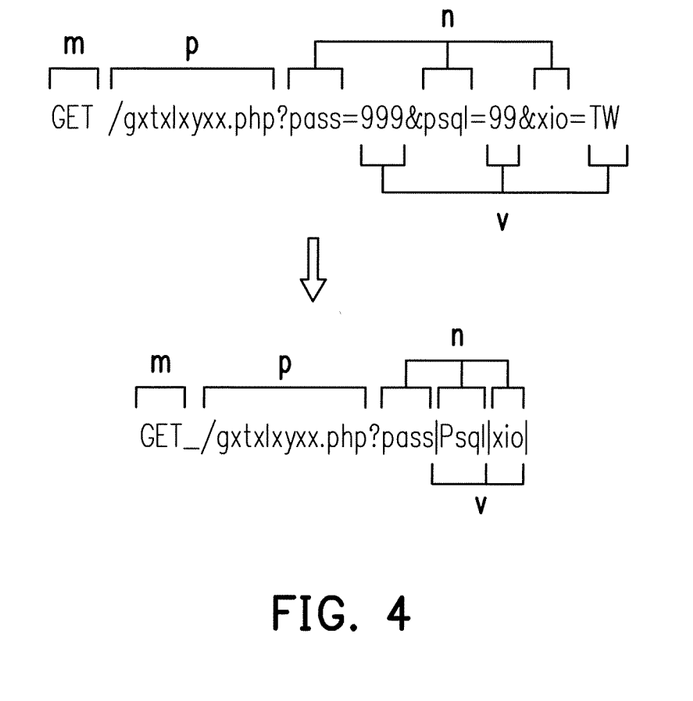
FIG. 4 is an example describing analysis of HyperText Transfer Protocol (HTTP) request.

For example, FIG. 4 is an example describing analysis of HTTP request. m represents a method used for asking Uniform Resource Locator (URL); p represents a page for asking URL; and the rest of information used for asking the URL is put after "?" as a pair of combination of key=value and separated by "&"; n represents the parameter names for asking the URL; and v represents parameter values. Since v may change more easily (some malwares are generated as random numbers), the embodiment uses the same symbol (e.g., |) to represent the content denoted by v. In other words, the embodiment of the disclosure does not (or does not consider) use the content of v. As shown in FIG. 4, an original HTTP request of "GET gxtxlxyxx.php?pass=999&psql=99&xio=TW" becomes the trace of GET_/gxtxlxyxx.php?pass|Psql|xio| after the parameter values are replaced by the same symbol (v) and combined with method (m). It should be indicated that the code and rule of replacement may be adjusted depending on the needs.

Figure 5:
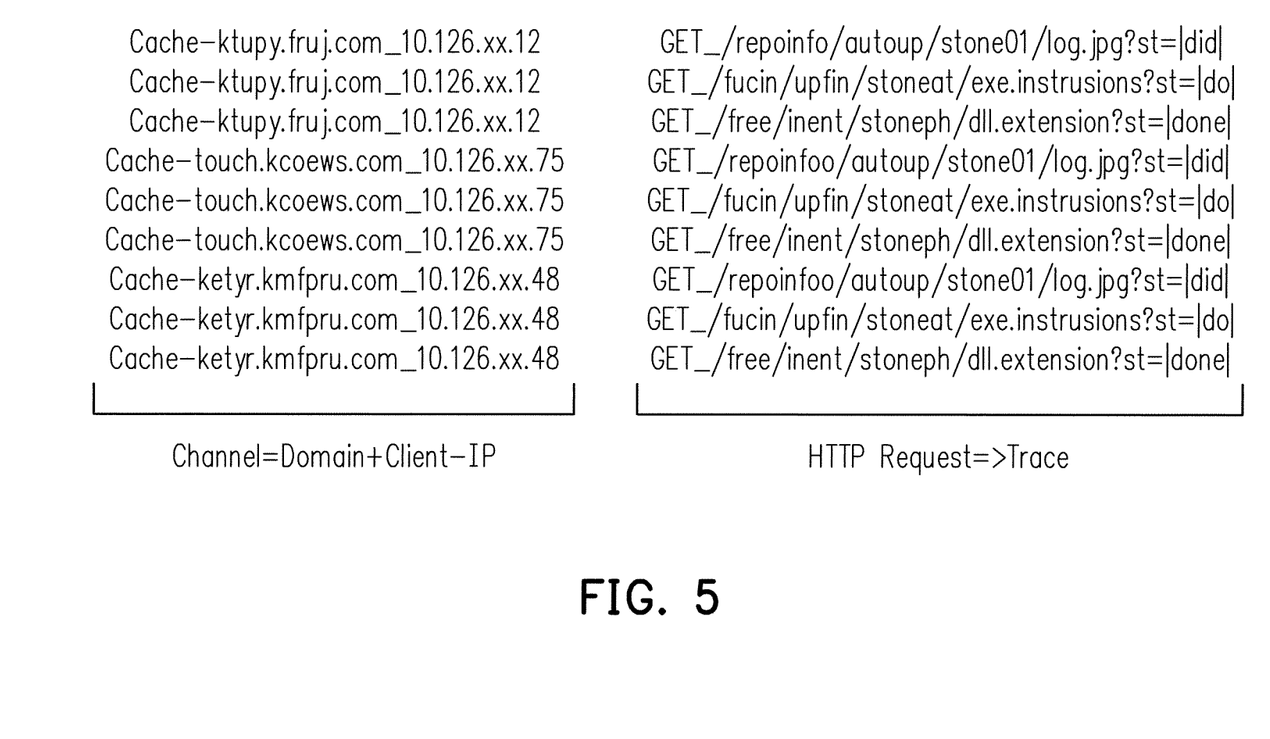
FIG. 5 is an example describing a content formed by analysis of network traffic data.

Based on the parsing method described above, the network traffic data can be parsed into the content shown in FIG. 5. Referring to FIG. 5, the channels formed between different domains and user IPs interact by using the traces formed by similar HTTP requests. Although the parameter values of the original HTTP request may change, based on the way via which the HTTP request is converted into traces, it can be clearly figured out that the traces for forming channels are very similar. Based on the actual situation described above, the embodiments of the disclosure regard the domain and the user IP in the network traffics as a channel. For example, the user IPs and domains in Items 1 and 2 of Table (1) are identical and may be regarded as the same channel 1.

Next, the model learning module 232 establishes a linking relationship between the traces and the channels (step S25). Specifically, after the channels are determined using the method described above, a set of the channel list may be regarded as C. On the other hand, a set of the trace list is regarded as T. The model learning module 232 uses each of the traces as a trace node and each of the channels as a channel node. Based on each of the network traffics, corresponding trace nodes and channel nodes are connected to form a bipartite graph of the trace and channel. The bipartite graph is called as a trace-channel behavior graph.

Figure 6:
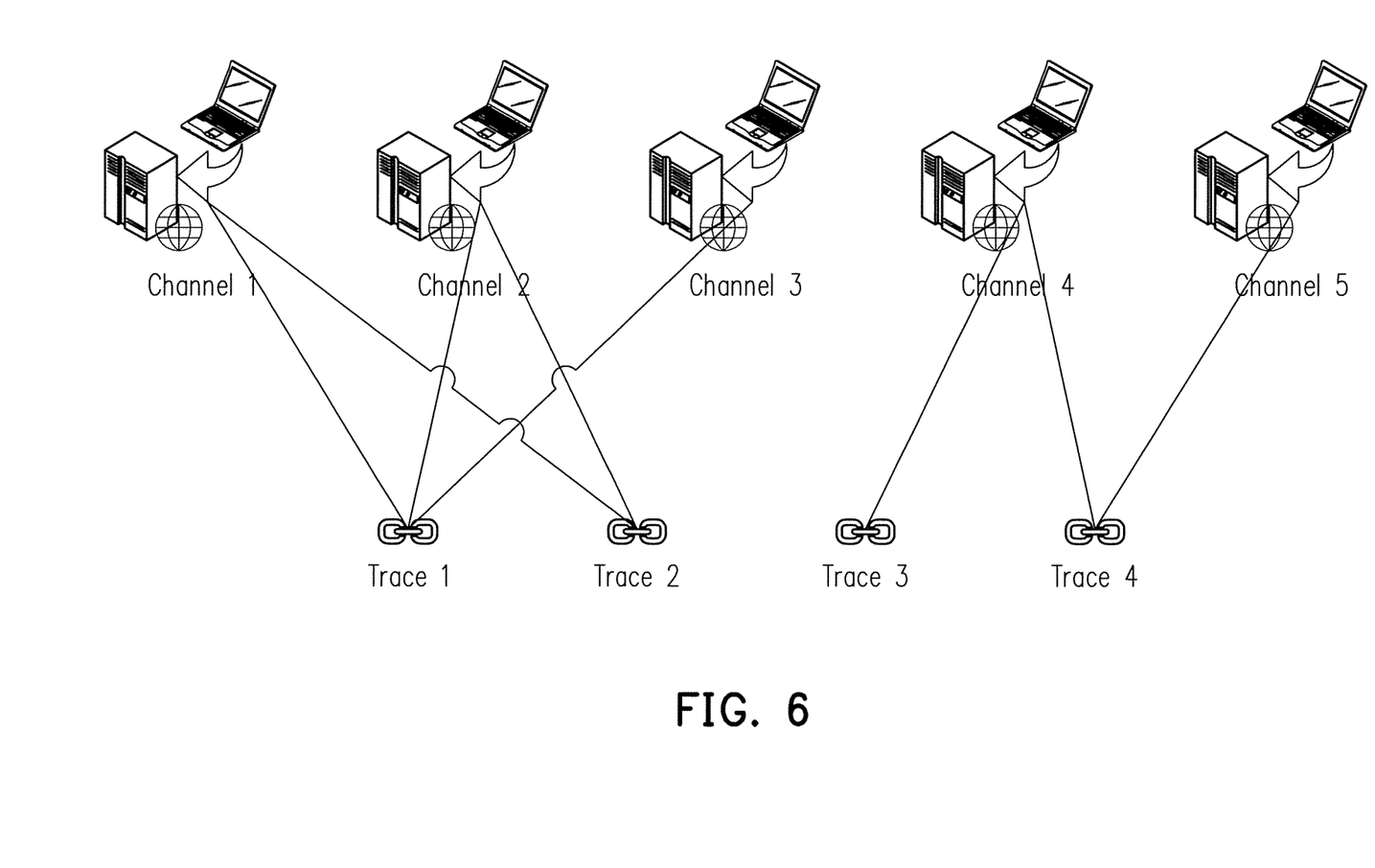
FIG. 6 is a trace-channel behavior graph established based on FIG. 3.

For example, FIG. 6 is a trace-channel behavior graph formed based on FIG. 3. By forming a trace through parsing a HTTP request, it can be obtained that a trace 1 "/$PAGE_a$?/$P_{a1}|P_{a2}|P_{a3}$|" and a trace 2 "/$PAGE_b$?/$P_{b1}|P_{b2}|P_{b3}$|" are both connected to the same channel 1. In this manner, the network traffics shown in the Table (1) indicate that the user IP and domain in Items 3 and 4 are equally regarded as a channel 2, and the trace 1 "/$PAGE_a$?/$P_{a1}|P_{a2}|P_{a3}$|" and the trace 2 "/$PAGE_b$?/$P_{b1}|P_{b2}|P_{b3}$|" are both connected to the same channel 2. The Item 5 is regarded as a channel 3, and the trace 1 "/$PAGE_a$?/$P_{a1}|P_{a2}|P_{a3}$|" is connected to a channel 3. The user IP and domain in Items 6 and 7 are equally regarded as a channel 4, and a trace 3 "/$PAGE_c$?/$P_{c1}|P_{c2}|P_{c3}$|" and a trace 4 "/$PAGE_d$?/$P_{d1}|P_{d2}|P_{d3}$|" are both connected to the same channel 4. Item 8 is regarded as a channel 5, and a trace 4 "/$PAGE_d$?/$P_{d1}|P_{d2}|P_{d3}$|" is connected to the channel 5.

Figure 7:
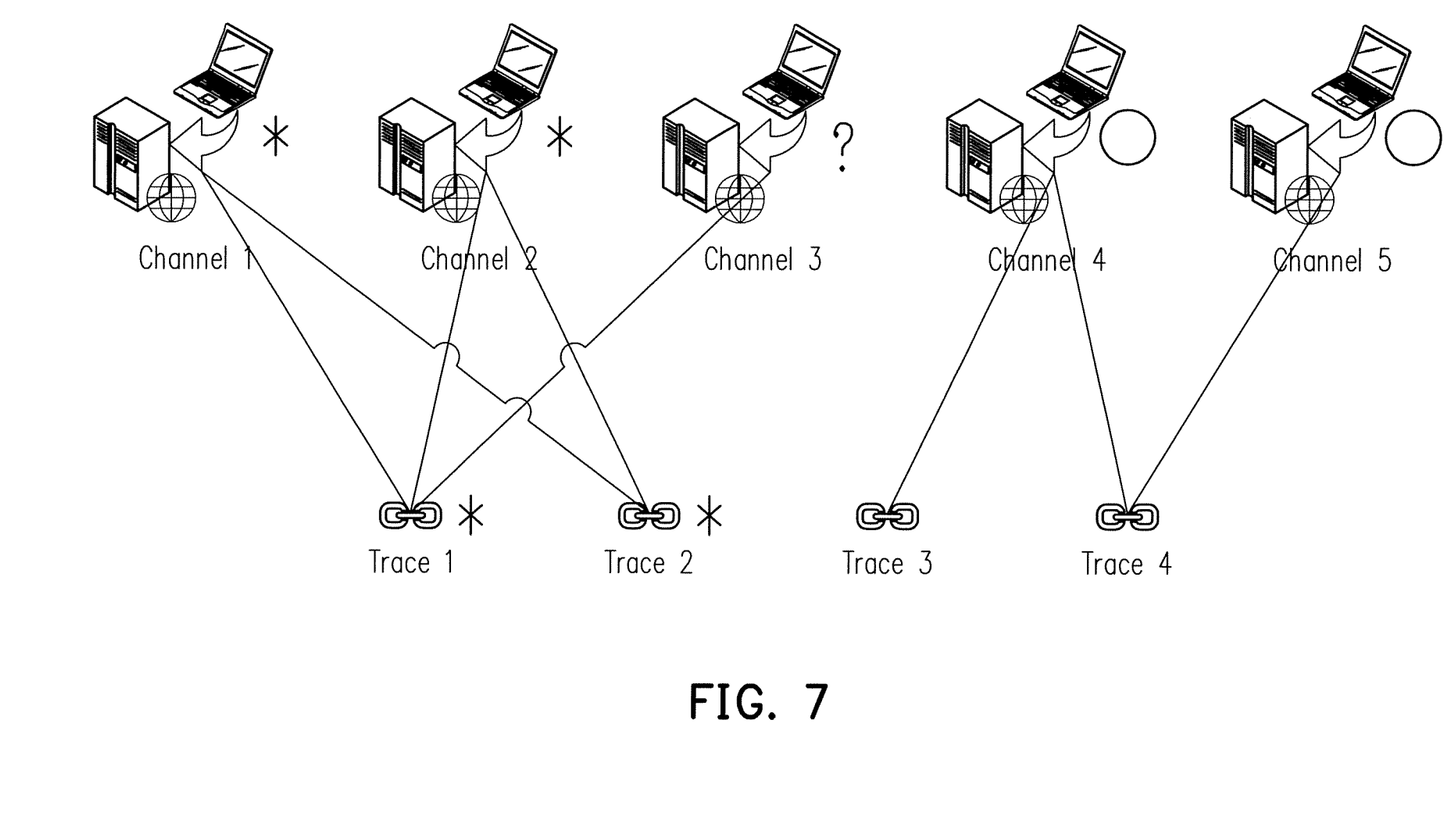
FIG. 7 is an example describing a schematic view of a trace-channel behavior graph after labeling.

After the trace-channel behavior graph is generated, the model learning module 232 can construct the malicious degree model based on the linking relationship formed through generation of the trace-channel behavior graph and the threat intelligence collected by the intelligence collecting module 235 (step S27). Specifically, the model learning module 232 labels all the channel nodes in the trace-channel behavior graph as malicious\benign\unknown channels according to the threat intelligence database 237. The channels in the PCAP generated by malware are all labelled as malicious, and the rest of channels formed by the captured network traffics are determined as benign or unknown channel based on comparisons of domain fields with the domain whitelist. Furthermore, the model learning module 232 labels, as malicious, the trace node which is connected to at least two channel nodes labelled as malicious. For example, FIG. 7 is an example of a schematic view of a trace-channel behavior graph after marking. In FIG. 7, "*" represents malicious, "?" represents unknown and "○" represents benign.

It should be indicated that the embodiment uses the trace-channel behavior graph for ease of analysis and observation in the subsequent process. However, in other embodiments, a look-up table and an array may be used to record the linking relationship between the traces and the channels.

Figure 8:
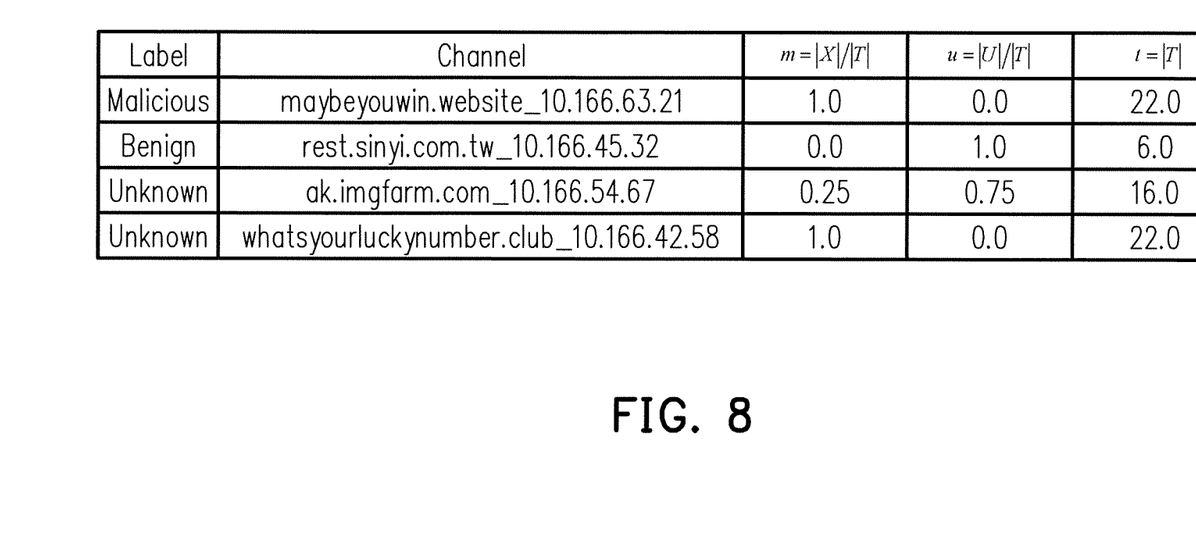
FIG. 8 is an example describing malicious/benign/unknown channels and feature values thereof.

The model learning module 232 calculates three feature values of the trace behavior according to the labelled results. The three feature values include a hacked trace feature value m, an unknown trace feature value u and the sum of all traces. The hacked trace feature value is obtained through m=|X|/|T|; wherein X is a set of the trace connected to the channel node labelled as malicious; and T is a set of all trace nodes. The unknown trace feature value is obtained through u=|U|/|T|, wherein U is a set of the trace connected to the channel node labelled as unknown. The sum of all traces is obtained through t=|T|. The model learning module 232 calculates the three feature values corresponding to all channels. For example, FIG. 8 is an example describing malicious/benign/unknown channels and the feature values thereof.

The model learning module 232 can thus input the acquired malicious\benign channels along with respective three feature values into machine learning algorithm (e.g. neural network, random forest, support vector and so on) for training so as to construct the channel malicious degree model.

Figure 9:
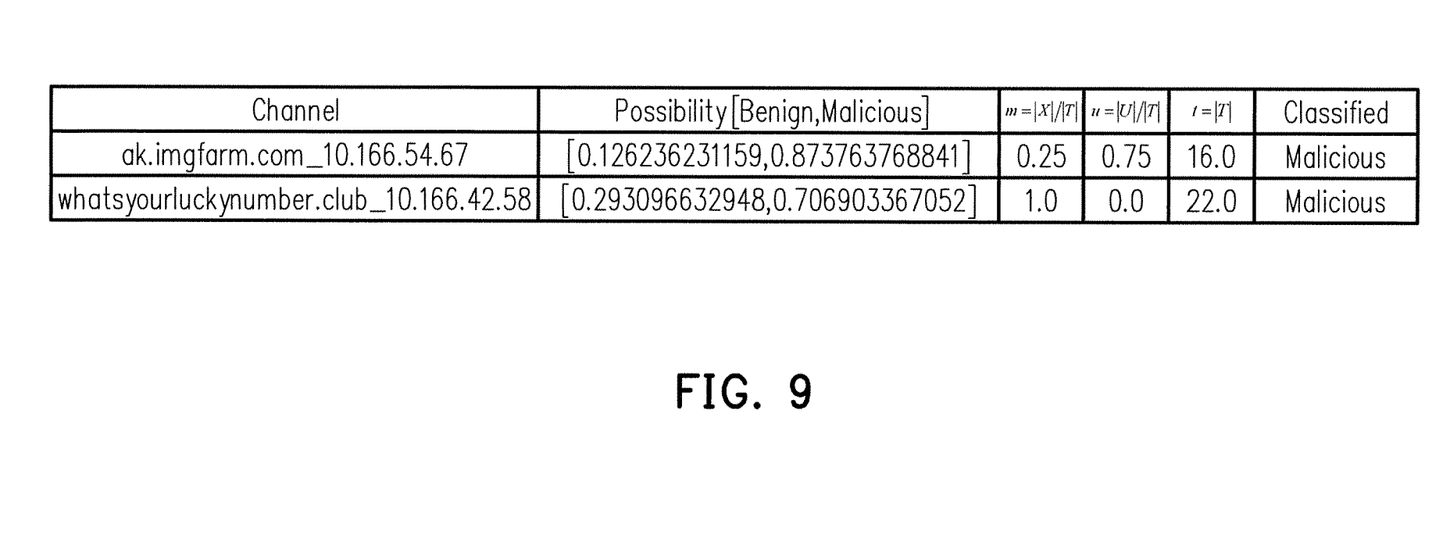
FIG. 9 is an example of assessing the degree of maliciousness of an unknown channel.

The cybercrime channel tracking module 233 (also referred to as classifier) can thus determine the degree of similarity between the unknown channel and the malicious/benign channels as well as the possibility for the user host getting hacked based on the malicious degree model (step S29). For example, FIG. 9 is an example of assessing the degree of maliciousness of an unknown channel. The channel that is initially labelled as unknown is classified into the malicious channel after being assessed by the malicious degree model according to possibility (e.g. the possibility of being malicious is larger than a specific value or larger than the possibility of being benign). The possibility represents the chance (degree) that the user IP and domain in the channel is malicious. The domain name that is determined as belonging to a malicious channel and information regarding possibility allow a third-party defending apparatus or the gateway apparatus 200 more flexibility in the use of domain intelligence. The gateway apparatus 200 installed in different companies can choose whether to adopt the intelligence of a certain domain based on possibilities. Therefore, the cybercrime channel tracking module 233 can integrate the intelligence collecting module 235 with the intelligence from other sources to be stored in the threat intelligence database 237 in the storage unit 230. When there are more labelled domains, it represents that there is more domain intelligence available for the model learning module 232 in constructing the channel malicious degree model, and the model that is trained can be constructed with higher precision. The intelligence sharing module 236 can also share the network threat intelligence (the above-mentioned assessment result (possibilities of corresponding channels)) of the cybercrime channel tracking module 233 with the third-party defending system of apparatus.

By verifying the above-mentioned assessment result with external threat intelligence (e.g., VirusTotal), it can be proved that the link that is classified as malicious by the cybercrime channel tracking module 233 is indeed a malicious domain recorded by the external threat intelligence.

It should be indicated that aforesaid detecting method of malicious domain and hacked host may also be a program recorded in a non-transitory computer readable medium such as a hard disk, a floppy disk, a flash drive, a CD and the like, and the program may be executed through any type of processing units (e.g., processing unit 250).

In summary, the embodiments of the disclosure provide a technology of detecting unknown malicious domain and hacked host by using network traffic log. By using the trace-channel behavior graph generated according to the behavior of the domain connected to the host in the network traffics, the interaction between the user host and a destination domain can be effectively represented. In addition, since the network channel is constructed through the user host 100 and the destination domain connected thereto, the maliciousness calculating method of network channel generated from connection features of malicious channel can calculate the degree to which the user host 100 of network channel is hacked and the malicious degree of the destination domain based on malicious degree assessment. On the other hand, the new network threat intelligence generated from the analysis conducted by the cybercrime channel tracking module 233 exhibits different degrees of maliciousness, and such intelligence allows a third-party blocking apparatus to choose degree of trust flexibly according to the circumstances.

Although the disclosure has been disclosed by the above embodiments, the embodiments are not intended to limit the disclosure. It will be apparent to those skilled in the art that various modifications and variations can be requested to the structure of the disclosure without departing from the scope or spirit of the disclosure. Therefore, the protecting range of the disclosure falls in the appended claims.

What is claimed is:

1. A detecting method of a malicious domain and a hacked host, adapted to a gateway apparatus, and comprising:
   receiving a plurality of network traffics;
   parsing a plurality of traces and a plurality of channels from the network traffics, wherein each of the channels is related to a connection between a domain and an Internet Protocol (IP) address, and each of the traces is converted from a HyperText Transfer Protocol (HTTP) request requested from the IP address for asking the domain, and each of the trace comprises at least one parameter of the HTTP request;
   establishing a linking relationship between the traces and the channels, wherein the linking relationship is a trace-channel behavior graph, each of the trace is used as a trace node, each of the channel is used as a channel node, the trace node and the channel node corresponding to each of the received network traffics are connected to form the trace behavior graph, and the trace-channel behavior graph belongs to a bipartite graph;
   labeling the trace nodes and the channel nodes;
   constructing a malicious degree model based on the linking relationship and a threat intelligence, and three feature values for each of the channels based on labelled result are calculated, the three feature values are a hacked trace feature value m, an unknown trace feature value u and a sum of all traces, wherein
   $m=|X|/|T|$, X is a set of the traces connected to a channel node labelled as malicious, and T is a set of all the trace nodes,
   $u=|U|/|T|$, U is a set of the traces connected to the channel node labelled as unknown, and
   the malicious degree model is trained based on the channel node labelled as malicious and the three feature values through a machine learning algorithm; and
   determining an unknown channel through the malicious degree model.

2. The detecting method according to claim 1, wherein the step of constructing the malicious degree model based on the linking relationship and the threat intelligence comprises:
   labeling, as malicious, a corresponding channel node based on the threat intelligence;
   labeling, as malicious, a trace node connected to at least two of the channel nodes labelled as malicious.

3. The detecting method according to claim 1, wherein the step of parsing the traces and the channels from the network traffics comprises:
   parsing information used for asking Uniform Resource Locator (URL) from one of HTTP requests among the network traffics to form the channels.

4. A gateway apparatus, respectively connected to an internal network and an external network, and the gateway apparatus comprising:
   a communicating unit, transmitting and receiving data;
   a storage unit, recording a plurality of modules; and
   a processing unit, coupled to the communicating unit and the storage unit, and accessing and executing the modules stored in the storage unit to perform:
   receiving a plurality of network traffics between the internal network and the external network via the communicating unit;
   parsing a plurality of traces and a plurality of channels from the network traffics;
   establishing a linking relationship between the traces and the channels;
   constructing a malicious degree model based on the linking relationship and a threat intelligence, wherein each of the channels is related to a connection between a domain and an IP address, and each of the traces is converted from a HyperText Transfer Protocol (HTTP) request requested from the IP address for asking the domain, each of the trace comprises at least one parameter of the HTTP request, the linking relationship is a trace-channel behavior graph, each of the trace is used as a trace node, each of the channel is used as a channel node, the trace node and the channel node corresponding to each of the received network traffics are connected to form the trace behavior graph, and the trace-channel behavior graph belongs to a bipartite graph, three feature values for each of the channels based on labelled result are calculated, the three feature values are a hacked trace feature value m, an unknown trace feature value u and a sum of all traces, and labeling the trace nodes and the channel nodes, wherein
   $m=|X|/|T|$, X is a set of the traces connected to a channel node labelled as malicious, and T is a set of all of the trace nodes,
   $u=|U|/|T|$, U is a set of the traces connected to the channel node labelled as unknown, and
   the malicious degree model is trained based on the channel node labelled as malicious and the three feature values through a machine learning algorithm; and
   determining an unknown channel through the malicious degree model.

5. The gateway apparatus according to claim 4, wherein the processing unit labels, as malicious, a corresponding channel node based on the threat intelligence, and labels, as malicious, a trace node connected to at least two of the channel nodes marked as malicious.

6. A non-transitory computer readable medium, recording a program, loaded through a gateway apparatus and executing the following steps:
   receiving a plurality of network traffics;
   parsing a plurality of traces and a plurality of channels from the network traffics, wherein each of the channels is related to a domain and an IP address, and each of the traces is converted from a HTTP request requested from the IP address for asking the domain, and each of the trace comprises at least one parameter of the HTTP request;
   establishing a linking relationship between the traces and the channels, wherein the linking relationship is a trace-channel behavior graph, each of the trace is used as a trace node, each of the channel is used as a channel node, the trace node and the channel node corresponding to each of the received network traffics are connected to form the trace behavior graph, and the trace-channel behavior graph belongs to a bipartite graph;

labeling the trace nodes and the channel nodes;
constructing a malicious degree model based on the linking relationship and a threat intelligence, and three feature values for each of the channels based on labelled result are calculated, the three feature values are a hacked trace feature value m, an unknown trace feature value u and a sum of all traces, wherein
m=|X|/|T|, X is a set of the traces connected to a channel node labelled as malicious, and T is a set of all of the trace nodes,
u=|U|/|T|, U is a set of the traces connected to the channel node labelled as unknown, and
the malicious degree model is trained based on the channel node labelled as malicious and the three feature values through a machine learning algorithm; and
determining an unknown channel based on the malicious degree model.

* * * * *